United States Patent [19]

Tomita

[11] Patent Number: 5,120,959
[45] Date of Patent: Jun. 9, 1992

[54] APPARATUS FOR SIMULTANEOUSLY EFFECTING ELECTROCHEMICAL MEASUREMENT AND MEASUREMENT OF TUNNELING CURRENT AND TUNNEL PROBE THEREFOR

[75] Inventor: Eisuke Tomita, Tokyo, Japan
[73] Assignee: Seiko Instruments Inc., Japan
[21] Appl. No.: 472,747
[22] Filed: Jan. 31, 1990

[30] Foreign Application Priority Data

Jan. 31, 1989 [JP] Japan .................................. 1-21550

[51] Int. Cl.⁵ .......................................... H01J 37/252
[52] U.S. Cl. .................................. 250/306; 250/307; 204/412; 204/400; 204/153.1
[58] Field of Search .............. 250/306, 307; 204/412, 204/400, 153.1

[56] References Cited

U.S. PATENT DOCUMENTS 4,868,396  9/1989  Lindsay .............................. 250/306
4,943,720  7/1990  Jones ................................. 250/306

FOREIGN PATENT DOCUMENTS 0318289  5/1989  European Pat. Off. .

OTHER PUBLICATIONS

Itaya et al., Surface Science 201, Jul. 1988, pp. L507-L512.

Lustenberger et al., J. Electroanalytical Chemistry, 243 (1988) pp. 225-235.
Analytical Chemistry, vol. 60, No. 8, Apr. 15, 1988, pp. 751-758, Fu-Ren F. Fan et al., "Scanning Tunneling Microscopic Studies of Platinum Electrode Surfaces".
Reviews of Modern Physics, vol. 59, No. 3, Jul. 1987, pp. 615-625, G. Binnig et al., "Scanning Tunneling Microscopy-from Birth to Adolescence".
Japanese Journal of Applied Physics, vol. 26, No. 11, Nov. 1987, pp. 1853-1855, S. Morita et al., "Construction of a Scanning Tunneling Microscope for Electrochemical Studies".
Soviet Inventions Illustrated, Derwent Publications, week E17, Abstract No. 34665, Jun. 9, 1982, Lovchikov A.K.
Patent Abstracts of Japan, vol. 13, No. 63 (C-568) [3411], Feb. 13, 1989, Tanaka Kikinzoku Kogyo K.K.

Primary Examiner—Jack I. Berman
Attorney, Agent, or Firm—Bruce L. Adams; Van C. Wilks

[57] ABSTRACT

An apparatus for simultaneously effecting electrochemical measurement and measurement of tunneling current has an electrochemical cell having a sample, a counter electrode, a reference electrode and a tunnel probe. The tunnel probe comprises an elongate body having a pointed tip, the body being composed of gold, gold alloy, graphite or carbon compound.

23 Claims, 2 Drawing Sheets

CURRENT-POTENTIAL CURVE OF AN Au ELECTRODE IN 1M $H_2SO_4$.

CURRENT-POTENTIAL CURVE OF
A Pt ELECTRODE IN 0.5M $H_2SO_4$

APPARATUS FOR SIMULTANEOUSLY EFFECTING ELECTROCHEMICAL MEASUREMENT AND MEASUREMENT OF TUNNELING CURRENT AND TUNNEL PROBE THEREFOR

BACKGROUND OF THE INVENTION

The present invention relates to an apparatus for simultaneously effecting electrochemical measurement and measurement of a tunneling current and a tunnel probe therefor.

More specifically, the present invention relates to an apparatus wherein a sample is subjected to potential control and in a solution to effect electrochemical measurement and, at the same time, detect a tunneling current flowing between the sample and a tunnel probe. More particularly, the present invention pertains to a scanning tunnel microscope (hereinafter referred to as "STM") which obtains the image of the sample surface on the basis of the detected tunneling current during electrochemical measurement.

PRIOR ART

It is a common technique that a sample is subjected to potential control to detect a current and thereby clarify an electrochemical reaction, and apparatuses that utilize this technique are commercially available in the form of potentiostat, polarography, etc. It is also a common method that a voltage is applied between a sample and a tip to thereby detect a tunneling current. Further, a means for obtaining the image of the sample surface on the basis of the detected tunneling current is known as scanning tunnel microscope. The scanning tunnel microscope is well-known, for example, in the specification of U.S. Pat. No. 4343993. Measurement using such a scanning tunnel microscope has been conducted under superhigh vacuum; recently, it has become possible to effect measurement also in the atmosphere or in a solution.

SUMMARY OF THE INVENTION

However, there has not yet been established a method which enables detection of a tunneling current simultaneously with measurement of an electrochemical reaction, for example, electrolytic deposition process, electrode corrosion process and various electrode reactions. Thus, it has heretofore been impossible to simultaneously effect electrochemical measurement and measurement of a tunneling current.

Further, since platinum is mainly used to form conventional tunnel probes, the potential region (window) where no electrochemical reaction of the probe occurs is narrow and it is therefore difficult to identify a substance deposited on the electrode in a solution.

To solve the above-described problems, the present invention comprises an electrochemical cell having a sample, a counter electrode, a reference electrode and a tunnel probe, which are disposed in a solution, a means for setting a potential of the sample, a means for detecting a current flowing between the sample and the counter electrode, a means for changing the distance between the sample and the tunnel probe, a means for setting a potential of the tunnel probe, and a means for detecting a tunneling current flowing due to the potential difference between the tunnel probe and the sample. According to circumstances, the present invention further includes a means which enables scanning of the potential of the sample and the potential of the tunnel probe.

Further, the present invention includes a scanning tunnel microscope device in which, with the potential difference between a sample and a tunnel probe being kept constant, the surface of the sample is scanned with the tunnel probe in the directions of the X- and Y-axes while effecting Z-axis control to control the distance between the tunnel probe and the sample so that the detected tunneling current is substantially constant, and the position of the tunnel probe is expressed by three-dimensional representation, thereby obtaining the image of the sample surface during electrochemical measurement. In particular, the tunnel probe is formed from a material selected from among gold, a gold alloy containing gold as the main component, carbon, and a carbon compound, thereby making it possible to enlarge, by a large margin, the potential region (window) where no electrochemical reaction of the tunnel probe itself occurs, and thus enabling identification of a substance deposited on the electrode in a solution or an impurity attached thereto.

By virtue of the above-described arrangement of the present invention, it becomes possible to fix the sample potential and measure a tunneling current. Thus, an electrode reaction that takes place on the basis of the sample potential can be analyzed from a change in the tunneling current, and by scanning the sample surface so that the level of the tunneling current is kept constant, it is possible to analyze the structure of the sample surface. The known scanning tunnel microscope for measurement in a solution is merely used to observe the sample surface in a solution. According to the present invention, however, it is possible to clarify the nature of an electrode reaction by detection of a tunneling current effected under control of the sample potential.

The following is a description of the function performed when the sample potential is scanned and the potential difference between the sample and the tip is made constant. In general, the process of an electrode reaction is analyzed on the basis of the potential-current curve (cyclic voltamogram) of a sample. However, employment of the method and apparatus of the present invention enables measurement of a tunneling current at each potential on the cyclic voltamogram and also makes it possible to obtain the structure of the sample surface at each potential and hence possible to analyze an electrochemical reaction in correspondence to the electrode surface structure.

Further, a material selected from among gold, a gold alloy containing gold as the main component, carbon, and a carbon compound has a wide window, i.e., 1.0 to 2.0 V. The fact that the window of the tunnel probe can be enlarged means that it is possible to enlarge the potential range within which the potential of the tunnel probe can be changed when a substance deposited on the electrode in a solution is identified by changing the potential of the tunnel probe and determining the energy level of the substance on the basis of a change in the tunneling current flowing at that time.

A probe that is made from gold has a wide window and is therefore suitable for the present invention. However, a probe that is made from a gold alloy containing gold as the main component which is obtained by adding trace amounts of Pd, Pt and W to gold with a view to improving the hardness and strength is also usable in the present invention.

Examples of probes made from carbon and a carbon compound which are suitably employed in the present invention are a probe made from a high-purity graphite impregnated with wax or the like, a probe made from pyrolytic graphite produced by thermal decomposition of hydrocarbon at a high-temperature and a reduced pressure, a carbon paste electrode formed by adding a binder, for example, epoxy, to graphite powder, and a probe made from a carbon compound obtained by adding a trace amount of boron carbide to carbon.

Further, it is preferable to form an insulating film, for example, a glass coating, over the tunnel probe of the present invention except for the tip of the probe.

DESCRIPTION OF THE PREFERRED EMBODIMENT

Examples of the present invention will be described below with reference to the drawings.

EXAMPLE 1

Figure 1:
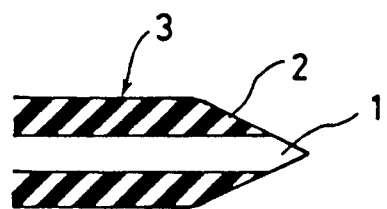
FIG. 1 is a sectional view of the tunnel probe of the apparatus for simultaneously effecting electrochemical measurement and measurement of a tunneling current according to the present invention.

FIG. 1 is a sectional view of the tunnel probe of the apparatus for simultaneously effecting electrochemical measurement and measurement of a tunneling current according to the present invention.

An elongate body comprised of gold wire having a diameter of 0.3 mm was subjected to mechanical polishing to form a sharp pointed tip, thereby obtaining an electrically conductive probe 1.

Next, glass coating was applied to the probe body 1 except for the tip to form an insulating layer 2, thereby obtaining a tunnel probe 3. With this tunnel probe 3, a current-potential curve was measured in a 1M $H_2SO_4$ solution. The result of the measurement is shown in FIG. 2.

Figure 2:
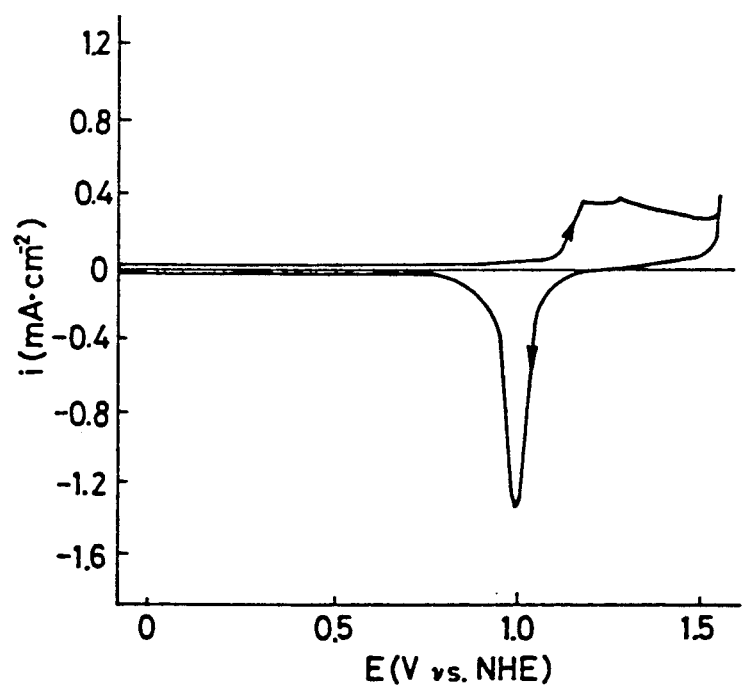
FIG. 2 is a graph showing the current-potential curve of an Au electrode in 1M $H_2SO_4$.

As will be clear from FIG. 2, the potential region (window) where no electrochemical reaction occurs is enlarged to a range of from −0.1 to +0.9 V, i.e., 1.0 V.

EXAMPLE 2

Tunnel probes 3 were prepared in the same way as in Example 1 except that the constituent material of the electrically conductive probe body 1 in Example 1 was replace by a gold alloy (Au: bal, Pd: 0.25 wt%, Pt: 0.25 wt%, and W: 0.25 wt%), high-purity graphite (glassy carbon), and a carbon compound formed by adding 3 wt% of boron carbide to carbon, respectively.

With these tunnel probes 3, windows were measured in the same was as in Example 1. The results of the measurement are shown in Table 1.

COMPARATIVE EXAMPLE

A tunnel probe 3 was prepared in the same way as in Example 1 except that the constituent material of the electrically conductive probe 1 was replaced by platinum, and a current-potential curve in a 0.5M $H_2SO_4$ solution was measured. The result of the measurement is shown in FIG. 3.

Figure 3:
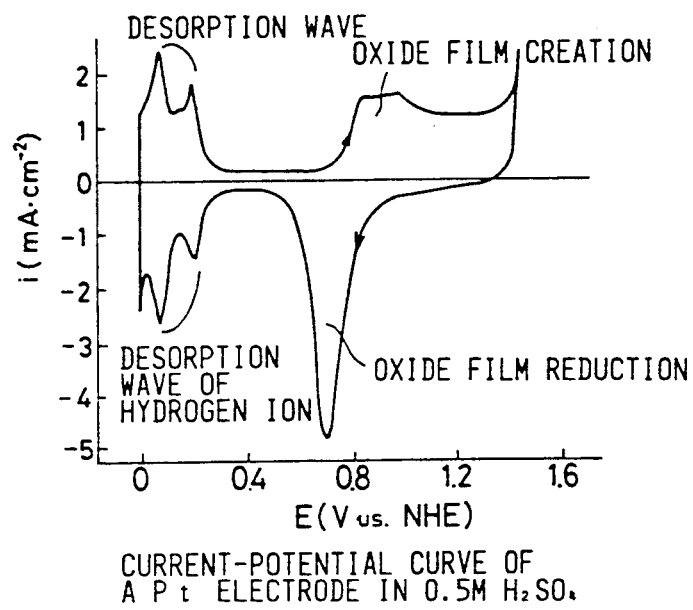
FIG. 3 is a graph showing the current-potential curve of an Pt electrode in 0.5M $H_2SO_4$.

As will be clear from FIG. 3, the window where no electrochemical reaction occurred was exceedingly narrow, i.e., a range of from +0.3 to +0.6 V (0.3).

TABLE 1

| Probe material | Present Invention | | | | Comparative Example Pt |
|---|---|---|---|---|---|
| | Au | Gold alloy | Graphite | Carbon compound | |
| Window | 1.0 V | 1.0 V | 2.3 V | 2.0 V | 0.3 V |

It is confirmed from Table 1 that, by forming a tunnel probe from gold, a gold alloy, carbon or a carbon compound, it is possible to attain a markedly wider window than in the case of the conventional platinum tunnel probe.

The following is a description of the operation of the apparatus according to the present invention that employs one of the tunnel probes prepared in Examples 1 and 2.

Figure 4:
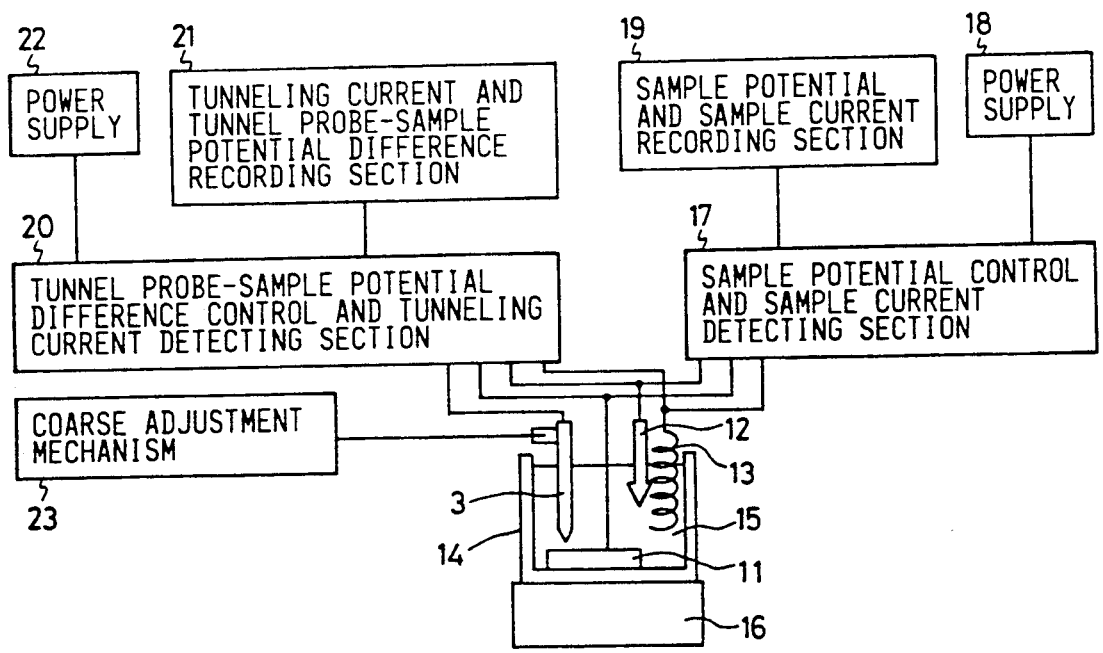
FIG. 4 is a schematic view of the apparatus for simultaneously effecting electrochemical measurement and measurement of a tunneling current according to the present invention.

FIG. 4 is a schematic view of the apparatus for simultaneously effecting electrochemical measurement and measurement of a tunneling current according to the present invention.

An electrochemical cell 14 has a sample 11, a reference electrode 12, a counter electrode 13 and a tunnel electrode 10 disposed therein and is filled with a solution 15.

The reference electrode 12 is a reference electrode that is generally employed in electrochemistry. Typical examples are SCE and silver-silver chloride electrodes. The tunnel probe 10 is formed from a probe material selected from among gold, a gold alloy, carbon and a carbon compound, subjected to mechanical polishing or stepwise polishing to form a sharp tip and coated with an insulating film, for example, glass coating, except for the tip.

The electrochemical cell 14 is installed on a shockabsorbing desk 16 in order to prevent variation in the distance between the tunnel probe 10 and the sample 11 caused by external factors, for example, vibrations.

The sample 11, the reference electrode 12 and the counter electrode 13 are connected to a sample potential control and sample current detecting section 17, thereby effecting potential setting of the sample 11 by use of the voltage supplied from a power supply 18, and thus enabling electrochemical measurement. The sample potential control and sample current detecting section 17 is connected to a sample potential and sample current recording section 19, thereby enabling recording of electrochemical measurement, for example, a potential-current curve.

The tunnel probe 3, the sample 11, the reference electrode 12 and the counter electrode 13 are further connected to a tunnel probe-sample potential difference control and tunneling current detecting section 20, which is connected to the sample potential control and sample current detecting section 17 and where a potential difference between the tunnel probe 3 and the sample 11 is set by use of the voltage supplied from a power supply 22 and also a tunneling current is detected. The tunnel probe-sample potential difference control and tunneling current detecting section 20 is connected to a tunneling current and tunnel probe-sample potential difference recording section 21 to effect recording.

In addition, a coarse adjustment mechanism 23 is installed to move the tunnel probe 3 to a distance from the sample 11 at which a tunneling current flows between the tunnel probe 3 and the sample 11.

More specifically, the tunnel probe of gold prepared in Example 1 was employed as the tunnel probe 3, HOPG (High-Order Pyrolytic Graphite) as the sample 11, silver perchlorate as the solution 15, and silver wire as the counter electrode 13. As a result, it was possible to obtain an STM image of deposition/fusion of Ag at the surface of HOPG in synchronism with the cyclic voltamogram.

Further, the surface of the sample 11 was subjected to scanning tunnel spectrophotometry to identify the deposit as Ag.

As has been described above, it is possible according to the present invention to simultaneously effect electrochemical measurement and measurement of a tunneling current and hence possible to analyze an electrochemical reaction in correspondence to the sample surface structure. Further, it is possible to enlarge the window of the tunnel probe by a large margin in comparison with the conventional probes and it is therefore possible to identify the deposit on the sample surface in a solution. Thus, the present invention provides an apparatus which is important to the fields of surface treating technology, semiconductors, etc.

I claim:

1. A tunnel probe in an apparatus employing an electrochemical cell having a sample, a counter electrode, a reference electrode and a tunnel probe, which are all disposed in a solution, to effect electrochemical measurement or measurement of a tunneling current; said tunnel probe being composed of a material selected from among gold, a gold alloy containing gold as the main component, graphite and a carbon compound.

2. A tunnel probe in an apparatus for effecting electrochemical measurement and measurement of a tunneling current, comprising: an elongate body having at one end a pointed tip, the body being composed of gold or gold alloy containing gold as the main component.

3. A tunnel probe according to claim 2; wherein the body is composed of gold.

4. A tunnel probe according to claim 3; including an insulating layer on the body except at the tipmost portion of the pointed tip.

5. A tunnel probe according to claim 4; wherein the insulating layer is comprised of glass.

6. A tunnel probe according to claim 2; wherein the body is composed of gold alloy.

7. A tunnel probe according to claim 6; wherein the gold alloy comprises an alloy of gold and one or more of palladium, platinum and tungsten.

8. A tunnel probe according to claim 7; including an insulating layer on the body except at the tipmost portion of the pointed tip.

9. A tunnel probe according to claim 8; wherein the insulating layer is comprised of glass.

10. A tunnel probe according to claim 6; including an insulating layer on the body except at the tipmost portion of the pointed tip.

11. A tunnel probe according to claim 10; wherein the insulating layer is comprised of glass.

12. A tunnel probe in an apparatus for effecting electrochemical measurement and measurement of a tunneling current, comprising: an elongate body having at one end a pointed tip, the body being composed of graphite or a carbon compound.

13. A tunnel probe according to claim 12; wherein the body is composed of graphite.

14. A tunnel probe according to claim 13; including an insulating layer on the body except at the tipmost portion of the pointed tip.

15. A tunnel probe according to claim 12; wherein the body is composed of a carbon compound.

16. A tunnel probe according to claim 15; wherein the carbon compound comprises carbon and boron carbide.

17. A tunnel probe according to claim 15; including an insulating layer on the body except at the tipmost portion of the pointed tip.

18. An apparatus for simultaneously effecting electrochemical measurement and measurement of a tunneling current comprising: an electrochemical cell having a sample, a counter electrode, a reference electrode and a tunnel probe; means for setting a potential of the sample; means for detecting a current flowing between the sample and the counter electrode; means for changing the distance between the sample and the tunnel probe; and means for detecting a tunneling current flowing due to the potential difference between the tunnel probe and the sample; wherein said tunnel probe is comprised of a material selected from among gold, a gold alloy containing gold as the main component, graphite and a carbon compound.

19. An apparatus according to claim 18; wherein the tunnel probe is comprised of gold or a gold alloy containing gold as the main component.

20. An apparatus according to claim 18; wherein the tunnel probe is comprised of graphite or a carbon compound.

21. In a method of simultaneously effecting electrochemical measurement and measurement of tunneling current of a sample immersed in an electroconductive solution using a tunnel probe, the improvement comprising: using a tunnel probe composed mainly of a material selected from among gold, a gold alloy containing gold as the main component, graphite and a carbon compound.

22. A method according to claim 21; wherein the tunnel probe is composed mainly of gold or a gold alloy containing gold as the main component.

23. A method according to claim 21; wherein the tunnel probe is composed mainly of graphite or a carbon compound.

* * * * *